(12) United States Patent
Beretta et al.

(10) Patent No.: US 12,007,367 B2
(45) Date of Patent: Jun. 11, 2024

(54) COMPUTER-IMPLEMENTED METHOD FOR THE PROBABILISTIC ASSESSMENT OF FATIGUE OF COMPONENT PARTS IN THE PRESENCE OF MANUFACTURING DEFECTS AND RELEVANT SYSTEM

(71) Applicant: POLITECNICO DI MILANO, Milan (IT)

(72) Inventors: Stefano Beretta, Milan (IT); Simone Romano, Milan (IT); Stefano Miccoli, Milan (IT)

(73) Assignee: POLITECNICO DI MILANO, Milan (IT)

( * ) Notice: Subject to any disclaimer, the term of this patent is extended or adjusted under 35 U.S.C. 154(b) by 435 days.

(21) Appl. No.: 17/416,435

(22) PCT Filed: Dec. 18, 2019

(86) PCT No.: PCT/IB2019/061016
§ 371 (c)(1),
(2) Date: Jun. 18, 2021

(87) PCT Pub. No.: WO2020/128896
PCT Pub. Date: Jun. 25, 2020

(65) Prior Publication Data
US 2022/0074837 A1   Mar. 10, 2022

(30) Foreign Application Priority Data

Dec. 21, 2018   (IT) .................. 102018000020743

(51) Int. Cl.
*G01N 3/08*   (2006.01)
(52) U.S. Cl.
CPC ....... *G01N 3/08* (2013.01); *G01N 2203/0016* (2013.01); *G01N 2203/0073* (2013.01)

(58) Field of Classification Search
CPC ............. G01N 3/08; G01N 2203/0016; G01N 2203/0073; G01M 5/0033
See application file for complete search history.

(56) References Cited

U.S. PATENT DOCUMENTS

2019/0166673 A1\* 5/2019 Kostrun ................. H05B 47/22

FOREIGN PATENT DOCUMENTS

| CN | 107 563 054 A | | 1/2018 | |
|---|---|---|---|---|
| CN | 108344372 | \* | 7/2018 | ............. G01B 11/24 |

(Continued)

OTHER PUBLICATIONS

Y. Hong et al., "Parallel Reflective Symmetry Transformation for Volume Data", Eurographics Symposium on Parallel Graphics and Visualization (2007), https://www.sciencedirect.com/science/article/pii/S009784930700204X.\*

(Continued)

*Primary Examiner* — Alexander Satanovsky
(74) *Attorney, Agent, or Firm* — ASLAN LAW, P.C.

(57) ABSTRACT

A computer-implemented method for the probabilistic assessment of fatigue of component parts in the presence of manufacturing defects comprises the following steps: importing predefined input data concerning at least one part of a component to be assessed; distinguishing a surface region of the part from an internal region; determining the volume and stress/deformation applied to the surface region and to the internal region; assigning the distribution of defects to a group of elements defined by the user; determining the maximum dimension of the defect in each surface or internal region considered; determining the critical dimension of the defect in each surface region or internal region by considering the fatigue strength of the material at the number of cycles under consideration, the stress/deformation applied and the position of each surface or internal (Continued)

region; calculating the reliability of at least one of the surface or internal regions considered.

13 Claims, 7 Drawing Sheets

(56) References Cited

FOREIGN PATENT DOCUMENTS

| CN | 107563054 | * | 10/2018 | ............ | G06F 17/50 |
|----|-----------|---|---------|--------------|------------|
| EP | 2 909 760 A1 | | 8/2015 | | |
| EP | 2909760 | * | 7/2018 | ............ | G06F 30/23 |

OTHER PUBLICATIONS

Torries Brian et al: "Overview on Microstructure- and Defect-Sensitive Fatigue Modeling of Additively Manufactured Materials", JOM Journal of Metals, Springer New York LLC, United States, vol. 70, No. 9, Jul. 25, 2018, pp. 1853-1862, XP036570396, ISSN: 1047-4838.

Ws Johnson et al: "Probabilistic Aspects of Life Prediction" IN: "ASTM International. Journal", Jan. 1, 2004, ASTM International, US, XP055403629, ISSN: 1546-962X, vol. 1, pp. ii-276.

\* cited by examiner ized. Due to the large dispersion and low reproducibility always associated with AM methods, the need to meet very strict reliability requirements still hinders the application of such technology, particularly in terms of fatigue strength.

COMPUTER-IMPLEMENTED METHOD FOR THE PROBABILISTIC ASSESSMENT OF FATIGUE OF COMPONENT PARTS IN THE PRESENCE OF MANUFACTURING DEFECTS AND RELEVANT SYSTEM

CROSS-REFERENCE TO RELATED APPLICATIONS

This application claims priority to IT Patent Application No. 102018000020743 filed on Dec. 21, 2018, and this application claims priority to and is a 371 of international PCT Application No. PCT/IB2019/061016 filed on Dec. 18, 2019, the entire contents of which are hereby incorporated by reference.

TECHNICAL FIELD

The present invention relates to a computer-implemented method for the probabilistic assessment of fatigue of component parts in the presence of manufacturing defects and relevant system.

BACKGROUND ART

Manufacturing defects are the most important and complex aspect of verifying the structural integrity of component parts obtained using different manufacturing methods (e.g. casting or forging), together with other causes of variability that have a significant effect.

The same considerations also apply to Additive Manufacturing (AM) methods. Despite the considerable benefits provided by AM systems, the application of such technology for structural components which are critical for safety, e.g., in the aerospace sector, is still far from being achieved and standardized. Due to the large dispersion and low reproducibility always associated with AM methods, the need to meet very strict reliability requirements still hinders the application of such technology, particularly in terms of fatigue strength.

The AM community and the major aerospace industries involved are beginning to agree on the fact that tolerance approaches to damage are required and that probabilistic methods are the most appropriate in order to obtain reliable but not overly conservative assessments.

DESCRIPTION OF THE INVENTION

The main aim of the present invention is to devise a computer-implemented method, and relevant system, for the probabilistic assessment of fatigue of component parts in the presence of manufacturing defects that allows assessing in a solid manner the fatigue strength and the critical positions of complex component parts in the presence of defects.

The objects set out above are achieved by the present computer-implemented method for the probabilistic assessment of fatigue of component parts in the presence of manufacturing defects according to the characteristics described in claim 1.

The objects set out above are also achieved by the present system for the probabilistic assessment of fatigue of component parts in the presence of manufacturing defects according to the characteristics described in claim 13.

BRIEF DESCRIPTION OF THE DRAWINGS

Other characteristics and advantages of the present invention will be more evident from the description of a preferred, but not exclusive, embodiment of a computer-implemented method, and relevant system, for the probabilistic assessment of fatigue of component parts in the presence of manufacturing defects, illustrated as an indication, but not limited to, in the attached tables of drawings in which.

EMBODIMENTS OF THE INVENTION

Figure 1:
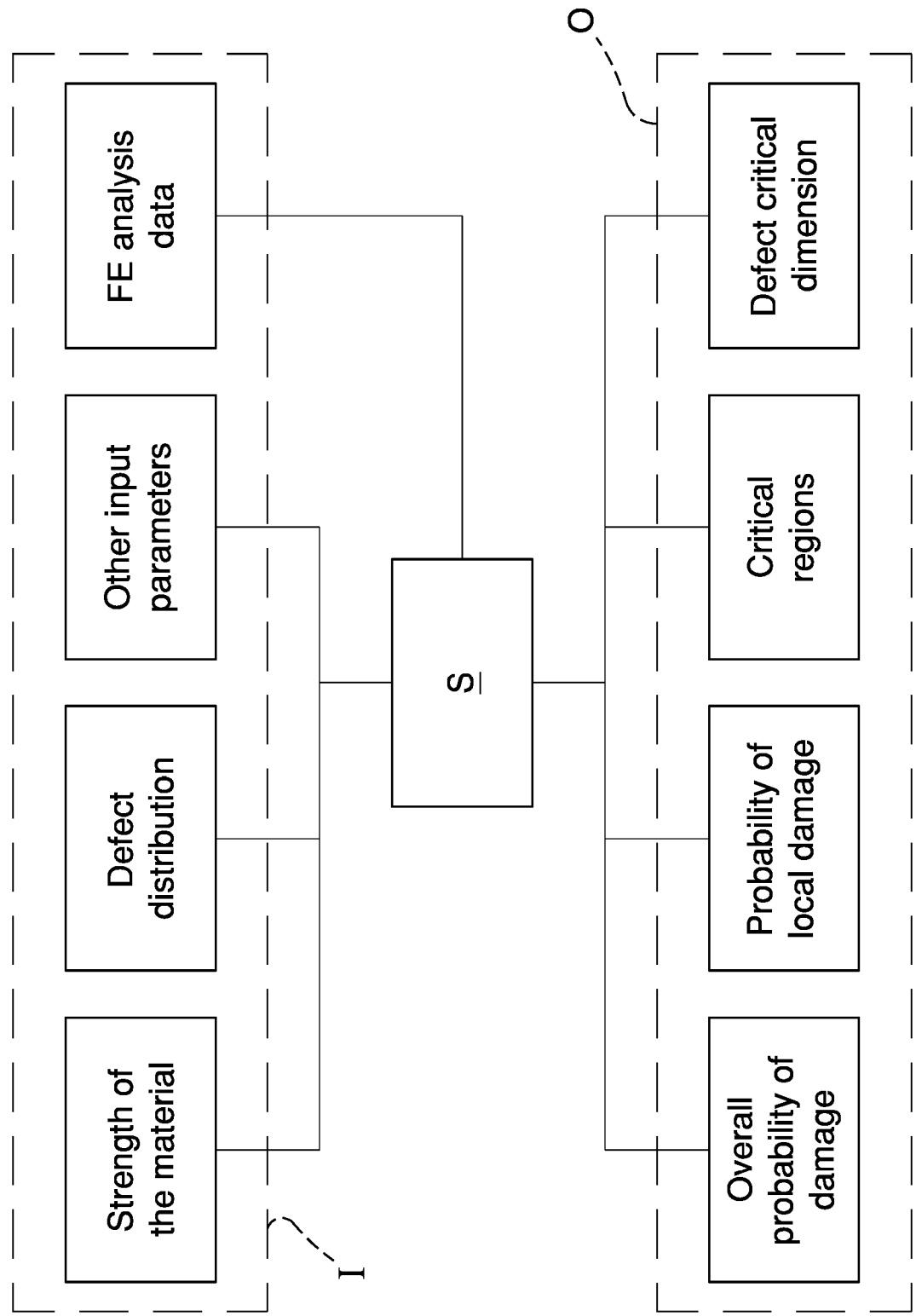
FIG. 1 is a general diagram wherein the input and output data managed by means of the system according to the invention are illustrated.
Figure 2:
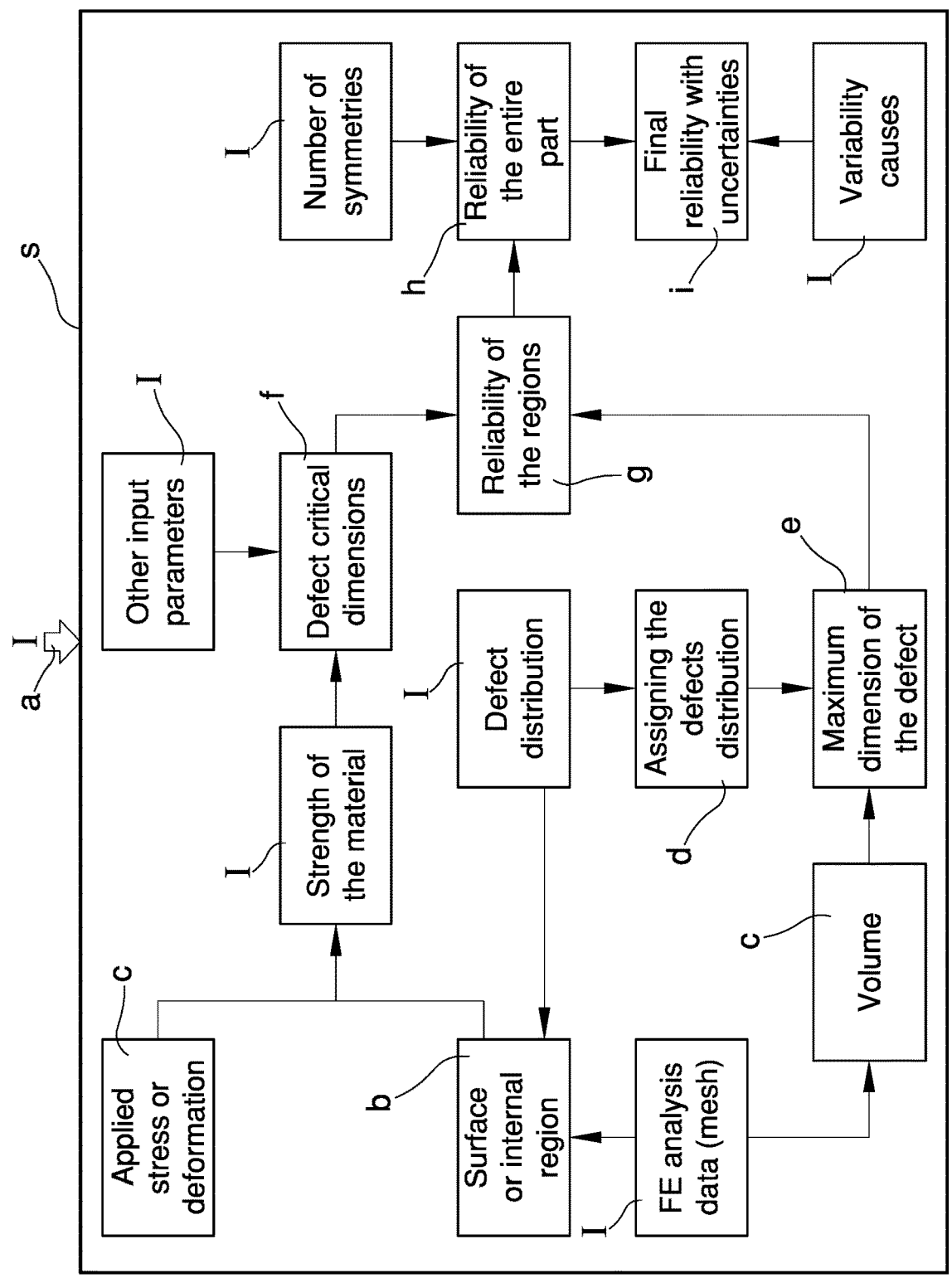
FIG. 2 is a general diagram of the method and system according to the invention.

With particular reference to these figures, reference letter S globally indicates a system for the probabilistic assessment of fatigue of component parts in the presence of manufacturing defects.

The system S comprises at least one processing unit configured to carry out the steps of a computer-implemented method according to the invention.

In particular, the system S carried out such probabilistic assessment on the basis of the results obtained by means of finite element analysis method (FE— Finite Element).

More specifically, the system S is based on a number of input data from a finite element analysis of a component part. Such data comprise at least the strain (stress/deformation) and information on geometry (mesh or directly volumes).

Given the mesh (expressed as at least one of numbers and/or coordinates of each node and/or point of integration, and through the connectivity of these in finite elements), it is possible to obtain areas and volumes relating to each node/point of integration/element, and the area relating to each face (calculation possibly already performed by the FE solver).

To generalize the calculation as much as possible, the use in input may be appropriate of all the data relating to the finite element simulation, e.g., the set of defined elements and nodes (here used to assess the symmetries and any regions to which to apply a distribution of the defects different from the main one), the steps and the whole, the data of the material, the loads and constraints applied, etc.

The system S comprises a standalone computer and software running on such computer.

For example, such software may be provided as a compiled executable suitable for common Windows operating systems.

Preferably, the language used for software programming is Python v3.

Advantageously, the computer-implemented method and carried out by the processing unit of the system S comprises at least the following steps of:

a) importing predefined input data I concerning at least one part of a component to be assessed;

b) distinguishing at least one surface region RE of the part from at least one internal region RI of said part;

c) determining the volume and stress/deformation applied to the surface region RE and to the internal region RI (e.g., as part of the results obtained by means of finite element analysis method (FE));

d) assigning the correct distribution of defects to all groups of elements defined by the user;

e) determining the maximum dimension of the defect in each surface or internal region RE, RI considered;

f) determining the critical dimension of the defect in each surface region or internal region by considering the fatigue strength of the material at the number of cycles under consideration, the position of each surface or internal region RE, RI and the stress/deformation applied on the surface region RE and on the internal region RI;

g) calculating the reliability of at least one of the surface or internal regions RE, RI considered.

h) determining the reliability of the entire part.

It should be noted that, with reference to any possible embodiments, step h to determine the reliability of the entire part may not be carried out.

In particular, the predefined imported input data (step a) comprise the following information:
finite element analysis data (FE) of the part (supported by a simulation software, e.g. Abaqus);
input parameters for analysis;
parameters relating to the distribution/s of the defect;
parameters relating to the strength of the material.

More specifically, the load case may comprise a constant amplitude assessment supported by the response of the elastic material.

More specifically, the load case may comprise data such as loads, constraints and the application thereof. In practice, such data are those which define the finite element model used.

The input parameters for analysis may comprise at least one of the following:
cycle ratio $$R = \frac{F_{min}}{F_{max}},$$

wherein F is the applied stress;
fatigue life to be assessed N;
variability and distribution of material strength (e.g. described by Lognormal distribution and considering a given coefficient of variation);
variability and distribution of the applied stress (e.g. described by Lognormal distribution and a given coefficient of variation);
parameters for the description of the strength;
number of symmetrical units $N_{symm}$.

The finite element static analysis (FE) data of the part can be obtained using appropriate simulation software (solver).

Preferably, the data determined by the finite element solver (stress, volumes) are defined in relation to the integration points. This ensures a determination of the stresses obtained without approximations due to extrapolations and nodal averages. Different embodiments cannot however be ruled out wherein, for example, such data are defined at the nodes, mediated on the elements or otherwise.

The defect distribution parameters may comprise: number of distributions used, type of distribution, parameters for analytical description, density of defects.

Furthermore, the material strength parameters preferably comprise a Kitagawa diagram for the studied load ratio. In addition, the material strength parameters may comprise an S-N curve and strength variability data.

The input data are at least partly stored within at least one input file.

According to a preferred embodiment, the system S comprises a plurality of input files selected from:
at least one output file generated by a simulation software (e.g., Abaqus) and containing the data and results of the finite element static analysis (FE);
at least one file containing the input parameters for analysis;
at least one file containing the parameters relating to the distribution of the defect;
at least one file containing the parameters relating to the strength of the material.

A first fundamental characteristic of the system S is given by the ability of the system to distinguish analytically between external surface regions RE and internal regions RI of the part to be assessed (step b).

In particular, the aforementioned step of distinguishing at least one surface region RE of the part from at least one internal region RI of the part comprises determining the surface region RE on the basis of a grid (mesh) of the finite elements.

Advantageously, this surface region RE can also be determined according to the distribution of defects and the resulting probability of occurrence of a defect in a surface region.

This makes it possible to define a different critical dimension of the defect according to the position of the volume of material under consideration.

Advantageously, such possibility allows performing an implicit (and therefore very fast) calculation, eliminating the assumption of considering all the defects as superficial (too conservative) or internal (often invalid and non-conservative assumptions).

The implicit calculation also makes it possible to significantly shorten the calculation times compared to explicit analyses based on fracture propagation algorithms.

Moreover, the possibility of assessing the effect of various distributions of defects in different regions of the part, makes it possible to consider the effect of anisotropy or of the non-random characteristics that could be found in the parts due to the manufacturing process.

Figure 3:
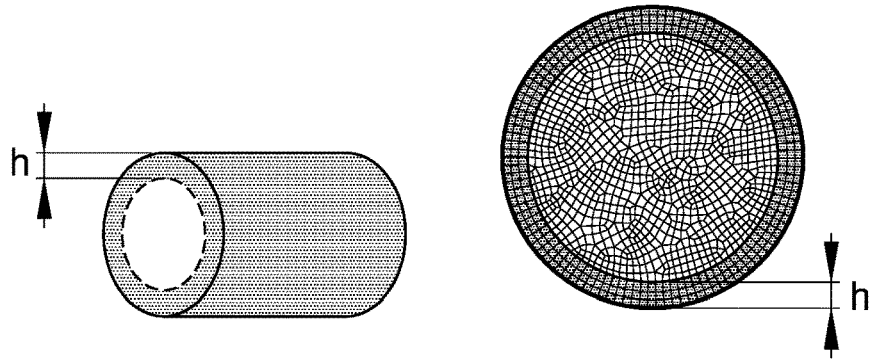
FIGS. 3 to 6 illustrate particular functions of the method and system according to the invention.

Preferably, the aforementioned step of distinguishing at least one surface region RE of the part from at least one internal region RI of the part comprises assessing the surface region RE as the volume comprised in a predefined distance h from an external surface of the part (FIG. 3).

For example, such volume can be determined by recognizing the external nodes and finding all the elements/nodes/points of integration comprised in that distance.

Given the grid (mesh), on the basis of the position of the nodes and the connectivity of the elements, all the faces of the elements belonging to a single finite element are recognized as surface regions.

The areas of each face can therefore be calculated starting from the positions of the nodes which make them up.

For each face it is finally possible to calculate a superficial "thickness" h, in order to obtain an equivalent superficial volume.

The application of different methods cannot however be ruled out.

Conveniently, according to a possible embodiment, next to the step of distinguishing at least one surface region from at least one internal region, the system S is configured to carry out at least one step of assessing the presence of symmetries and removing the nodes on the planes of symmetry from the list of surface nodes.

In practice, if a plane of symmetry exists in the finite element model FE, all the faces of this plane are superficial.

Since in reality they are not, the user is able to indicate which set of nodes belongs to the plane of symmetry, so that the system S does not consider these nodes as superficial.

According to a preferred embodiment of the system S, the aforementioned step of determining the volume and stress/deformation applied to the surface region RE and the internal region RI (step c) provides for the following.

With reference to the determination of the stress, the system S preferably provides for the determination of the maximum main stress, inasmuch as this parameter is the best suited to describe the fatigue strength of cracks and defects.

Nevertheless, the use of any type of equivalent stress/deformation definable on the basis of the results of the finite element analysis FE cannot be ruled out.

The volume is a geometric quantity defined by the grid (mesh) used. The calculation of the volume can be done in different ways, and can change depending on the type of grid used.

According to a possible embodiment, the volume of each mesh integration point is calculated according to the following formula:

$$V = |J| \cdot \omega_\xi \cdot \omega_\eta \cdot \omega_\zeta$$

where ($\xi$, $\eta$, $\zeta$) are the isoparametric coordinates relating to each finite element, the terms $\omega_\xi$, $\omega_\eta$, $\omega_\zeta$ are the Gauss weights for such coordinates, while $|J|$ is the determinant of the Jacobean matrix of the rigidity.

With reference to the step of assigning the correct distribution of the defects to all the groups of elements defined by the user (step d), it is pointed out that the system S always allows obtaining a "generic" distribution associated with the part. In addition, several distributions to be associated with regions selected by the user can be considered.

For example, the determination of the distribution of defects to be used may be based on the analysis of X-ray computed tomography data (see, for example, S. Romano, A. D. Brandão, J. Gumpinger, M. Gschweitl, S. Beretta, Qualification of AM parts: Extreme value statistics applied to tomographic measurements, Mater. Des. 131 (2017) 32-48. doi:10.1016/j.matdes.2017.05.091).

Still according to a possible and preferred embodiment, the aforementioned step of determining the maximum dimension of the defect in each surface region and/or internal region considered (step e) comprises the application of the statistics of extreme events.

For example, a possible way to assess the dimension of the defect regardless of the shape is proposed in the document Y. Murakami, Metal fatigue: effects of small defects and nonmetallic inclusions, Elsevier, 2002.

The step of determining the critical dimension of the defect in each surface region RE or internal region RI (step f) is made according to the stress/deformation applied to the part, to the strength of the material and to the fatigue life N being considered.

One possible solution may be to assess the fatigue strength by describing life using a Wöhler curve and the fatigue limit using a Kitagawa diagram.

A possible and effective way to describe the Wöhler curve is to use a linear relation in double logarithmic coordinates, defined through the position of the knee $N_{k,\sigma}$ and of the inverse negative slope $k_\sigma$. A possible and effective way to describe the Kitagawa diagram foresees the use of the El-Haddad model based on the parameter $\sqrt{area}$ of Murakami.

This formulation of the El-Haddad model is defined by the parameters $\Delta\sigma_{w0}$ and $\sqrt{area_0}$ (see, for example, document S. Romano, A. Brückner-Foit, A. D. Brandão, J. Gumpinger, T. Ghidini, S. Beretta, Fatigue properties of AlSi10Mg obtained by additive manufacturing: Defect-based modelling and prediction of fatigue strength, Eng. Fract. Mech. 187 (2018) 165-189. doi: 10.1016/j.engfracmech.2017.11.002).

Preferably, the critical dimension of the defect is determined by means of the following equation:

$$\sqrt{area}_{cr} = \sqrt{area}_0 \cdot \left\{ \left[ \left( \frac{N_{k,\sigma}}{N} \right)^{1/k_\sigma} \cdot \frac{\Delta\sigma_{w0}}{\Delta\sigma} \right]^2 - 1 \right\}$$

where $\Delta\sigma$ is the variation of applied stress.

Figure 6:
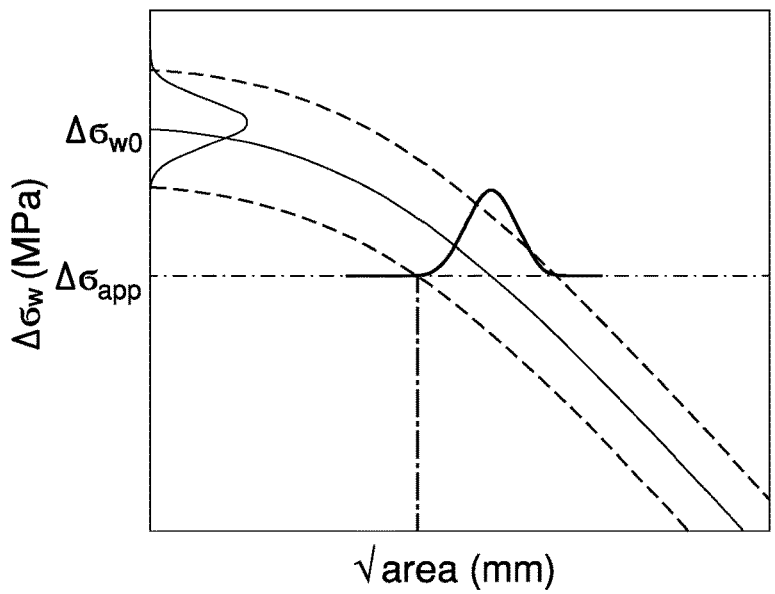

Advantageously, according to a preferred embodiment, the critical dimension of the defect is determined as a safe percentile target defined by the user (FIG. 6).

This makes it possible to assess the acceptability of the defects in each region of the component and to qualify the part.

The system S also provides for performing the aforementioned steps c) to f) for all fatigue lives and for all applied loads under consideration.

According to a preferred embodiment, the step of calculating the reliability (step g) is carried out for all the surface or internal regions RE, RI considered.

Preferably, the aforementioned step of determining the reliability $R_V$ of the entire component is carried out by applying the Weakest-Link model, considering the symmetries where applicable, using the following formula:

$$R_V = \left[ \prod_{i=1}^{N_V} R_i \right]^{N_{symm}}$$

where $N_V$ is the number of sub-volumes that make up the part, $N_{symm}$ is the number of units that are symmetrical to that assessed making up the model as a whole, $R_i$ is the reliability of the i-th region.

Advantageously, the processing unit of the system S is configured to carry out a step of determining the final reliability $R_f$ (with uncertainties) of the component (step i), starting from the determined reliability $R_V$ of the component and assessing the effect of the variability of the stress applied and of the fatigue strength of the material.

Preferably, such final reliability $R_f$ is determined by means of the following formula:

$$R_f = \int f(x) \cdot R_V(x) \cdot dx$$

where x is the variable considered and f(x) is its probability density.

Figure 4:
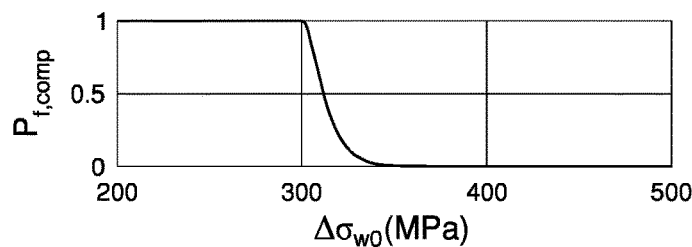
Figure 5:
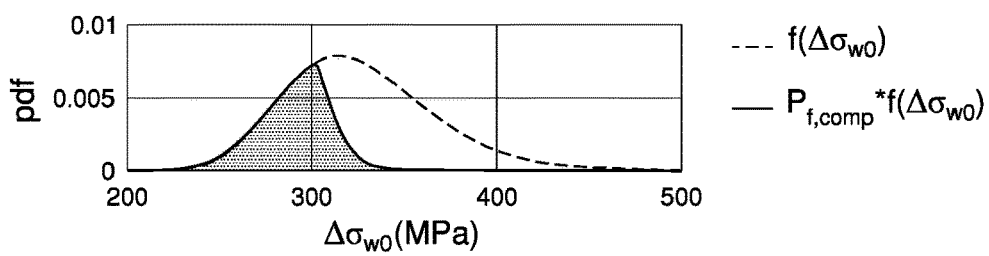

Advantageously, the system is able to carry out a fully probabilistic analysis by assessing the effect of applied stress/deformation and strength variability by means of numerical integration (FIGS. 4 and 5).

This makes it possible to keep the model analytical and fast and to obtain robust results considering all the main sources of dispersion.

The system S also comprises carrying out at least one step of generating output data comprising at least one text file containing the overall probability of damage to the part for the duration and the loads examined (values of Pf relative to the possible life or load).

Furthermore, according to a preferred embodiment, the output data comprise at least a new output database file (.odb) containing the finite element static analysis (FE) data together with:

a map of the normalized failure probability, for a qualitative and visual assessment of the more critical regions of said part (normalization is performed automatically by the system S to improve the display of results);

a quantitative map of the defect critical dimension;

a quantitative map of local failure probability relating to any mesh integration point.

Preferably, the quantitative map of the defect critical dimensions is calculated as a percentile (e.g. µ-3σ) defined by the user (FIG. 6).

Conveniently, the system S comprises a simple graphical user interface (GUI) configured to enter the input data or to load previously defined input data.

The input files (except those relating to the FE analysis) are automatically written and saved by the system S.

The system S then reads the input files, carries out the calculations based on this data, and writes the output files to the working directory.

The output database can then be opened inside the post-processor FE (which may be the solver used for the finite element analysis or a different mesh display software) for displaying the local results.

In particular, the system S is implemented by means of a software program comprising a plurality of software components configured to perform the steps described above.

In particular, the system S comprises a graphical interface module (GUI) for I/O communication with the user. The graphical interface module requires the user to enter all the necessary data and input file positions of the finite element simulations.

The system S may also comprise a pre-processor finite element analysis module. The pre-processor module prepares (and launches) the finite element analysis.

Advantageously, the system S comprises an input data processing module configured to perform the steps a, c, and d described above. The input data processing module is one of the core modules of the system S and takes in input the input data entered by the user and the results of the finite element analysis to create the input files.

Advantageously, the system S comprises a surface module configured to carry out the step b described above.

In particular, the surface module is configured to:
take the grid (mesh) at input;
determine the surface nodes;
calculate the surface area associated with them;
define the volume associated with such regions as a product of the area calculated for a suitably calculated thickness h.

Usefully, the system S may comprise a symmetry module. In particular, the symmetry module is configured to read the mesh used and the inputs given by the user in relation to the symmetries and eliminate the nodes belonging to the planes of symmetry from the list of surface nodes.

Advantageously, the system S comprises a local calculation module configured to carry out the aforementioned steps e, f, g.

In particular, the local calculation module is configured to read the input files, apply statistics of extreme events to determine the dimension of the maximum defect in each area considered and calculate the local magnitudes (probability of failure, critical dimension of defect).

Advantageously, the system S comprises a global calculation module configured to perform the step h described above.

In particular, the global calculation module is configured to take at input the results obtained through the local calculation module and determine the global results through the Weakest-Link approach, also considering the symmetries of the problem.

Advantageously, the system S comprises a variability module configured to carry out the step i described above.

In particular, the variability module is configured to take at input the results obtained through the global calculation module and make the necessary integrations to determine the global results considering the variability of applied stress and/or strength of the material.

Usefully, according to a possible embodiment, the system S comprises a results module configured to take at input all the previously obtained results, write the output files and produce the required graphs.

Usefully, according to a possible embodiment, the system S comprises a post-processor module configured to read the output files and translate the output files for final display inside a mesh display software.

It has in practice been found that the described invention achieves the intended objects.

In particular, the fact is underlined that the possibility of distinguishing analytically between the surface region and the internal regions makes it possible to define a different critical dimension of the defect according to the position of the volume of material under consideration. This possibility makes it possible to perform an implicit (and therefore very fast) calculation, thus eliminating the assumption of considering all defects as superficial (too conservative) or internal (often invalid and non-conservative assumptions).

Figure 7:
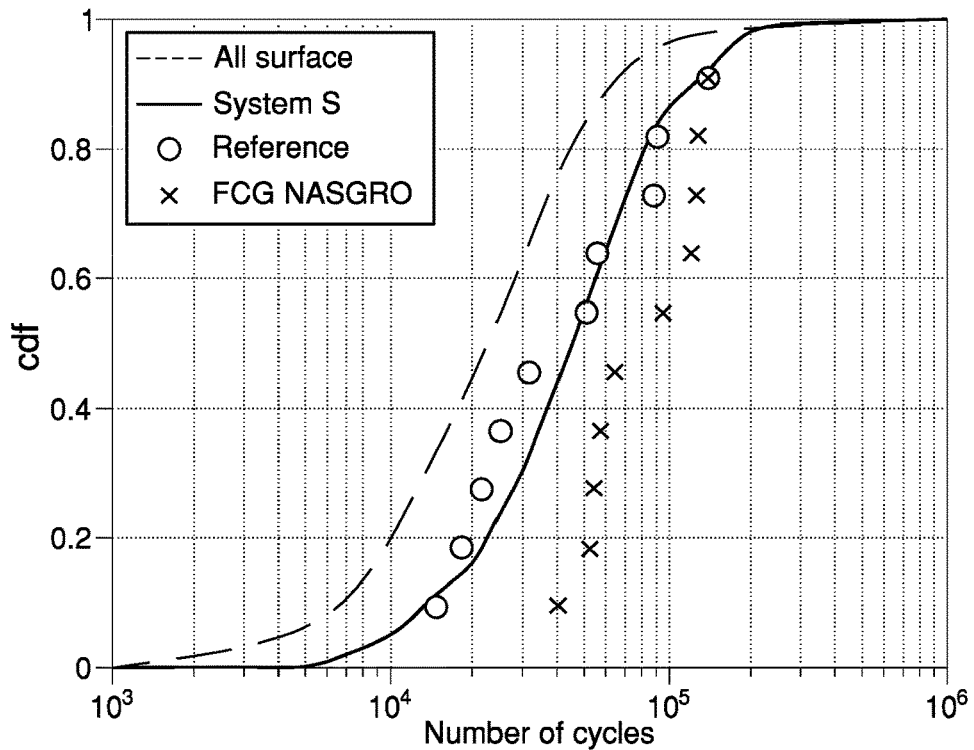
FIGS. 7 to 13 illustrate, by way of example, possible results obtainable by the method and the system according to the invention.
Figure 8:
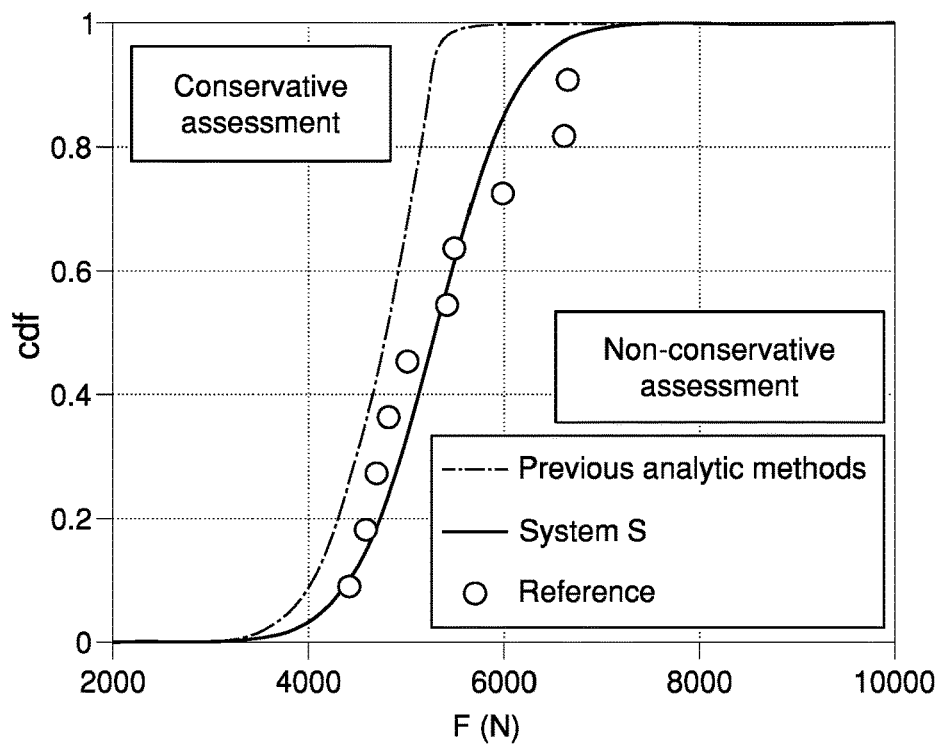

In this regard, FIGS. 7 and 8 show a comparison, by way of example, of the results obtained using conventional methods of analysis, compared to results obtained using the system according to the invention.

In particular, FIG. 7 illustrates the probability of failure of a cut test piece as the fatigue life varies.

The result obtained through the system S is slightly conservative with respect to the state of the art and very close to the life distribution estimated by assessing each test piece with a fatigue approach of deterministic type (Reference) and compared to simulations carried out using NASGRO software. FIG. 7 also shows the important decrease in conservativity obtained by distinguishing between the surface regions RE and the internal regions RI.

FIG. 8 illustrates the probability of failure of a cut test piece as fatigue life varies obtained through the system S and compared to a classical analytical methodology based on 90% volume, and with a methodology described in literature.

Moreover, the carrying out of a completely probabilistic analysis, with an assessment of the effect of the applied stress/deformation and of the strength variabilities through numerical integration, makes it possible to maintain an analytical and fast model and to obtain robust results considering all the main sources of dispersion.

Figure 9:
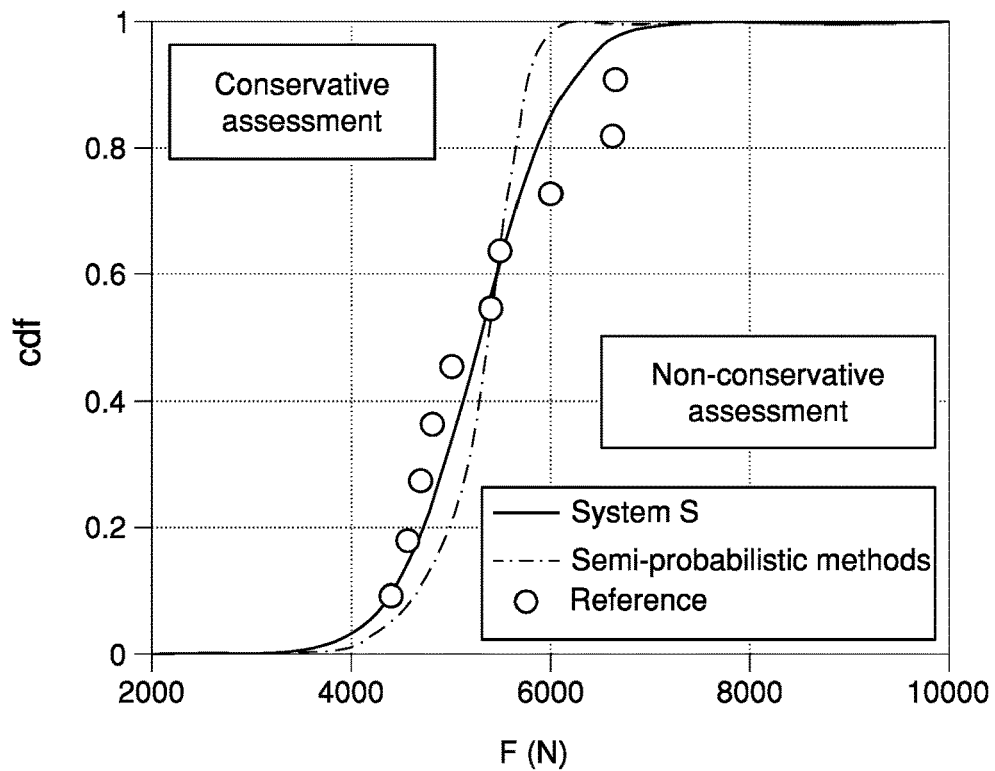
Figure 10:
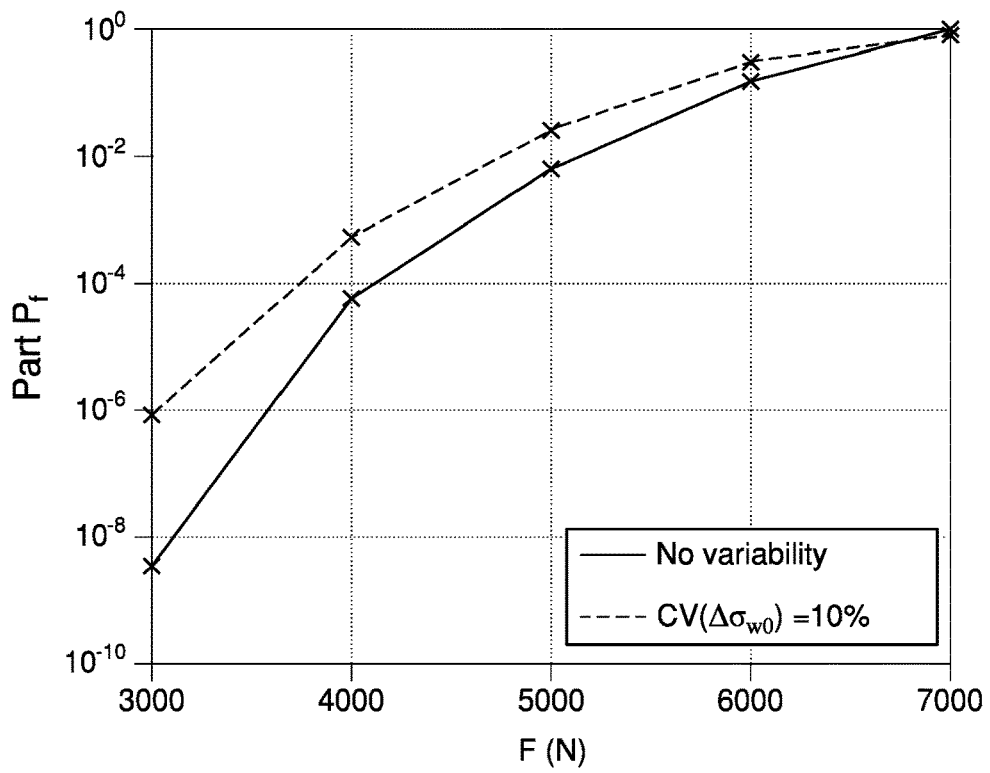

FIGS. 9 and 10 show, by way of example, a comparison between the results obtained using semi-probabilistic methods of the conventional type, compared to results obtained using the system according to the invention.

In particular, FIG. 9 illustrates the influence of the variability of applied stress/deformation and strength on the end result compared to a semi-probabilistic simulation introducing a variability of 10% on strength.

FIG. 10 illustrates the probability of failure according to the fatigue life assessed by describing strength as deterministic or introducing a 10% variability on strength.

Another advantage is given by the fact that the definition of the critical dimensions of the defect as a safe percentile target defined by the user makes it possible to assess the acceptability of the defects in each region of the component and to qualify the part.

Figure 11:
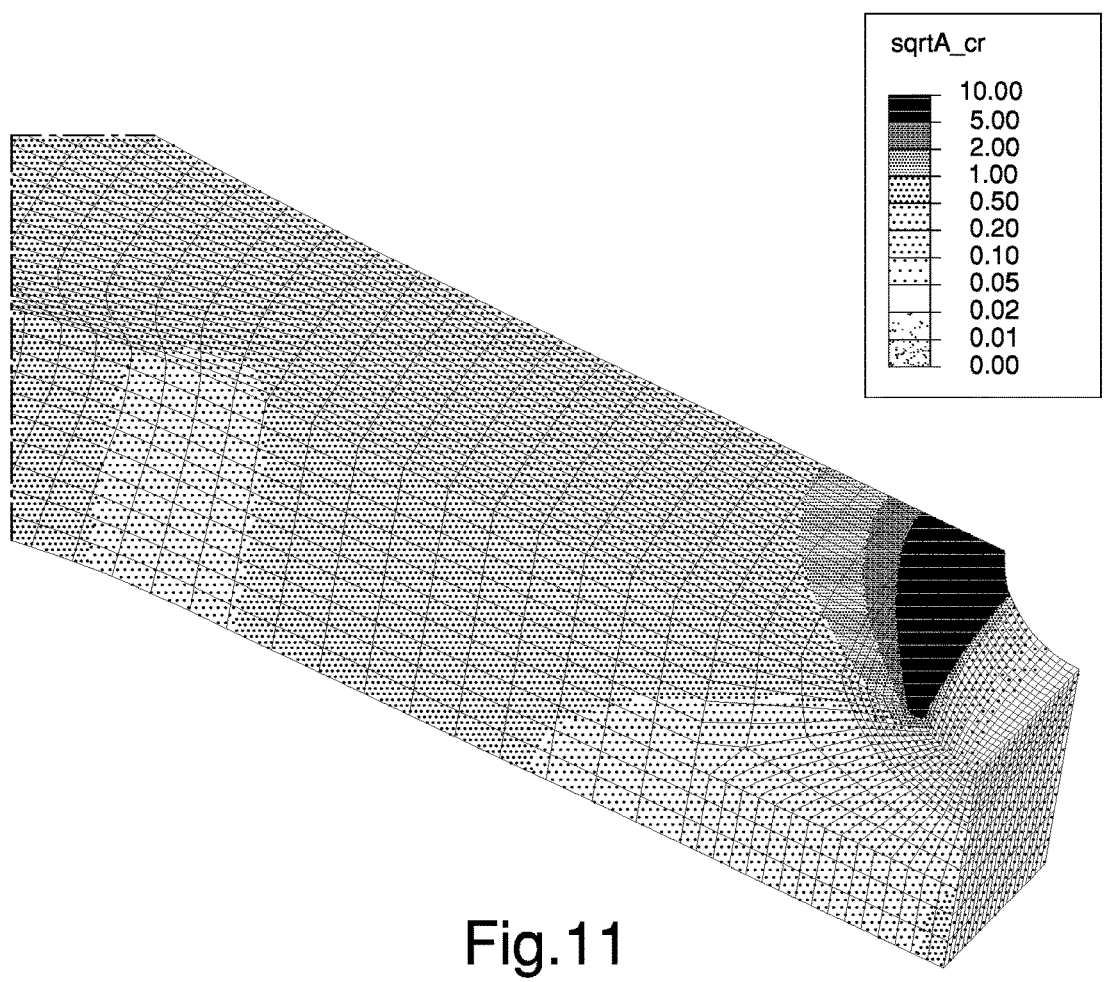

For example, FIG. 11 shows a map of the critical dimension of the defect for a cut test piece subject to axial stress.

A further technical effect is given by the fact that, giving the user the possibility to assess the effect of various distributions of defects in different regions of the part, the system according to the invention makes it possible to consider the effect of anisotropy or of non-random characteristics that could be found in the parts due to the manufacturing process.

Figure 12:
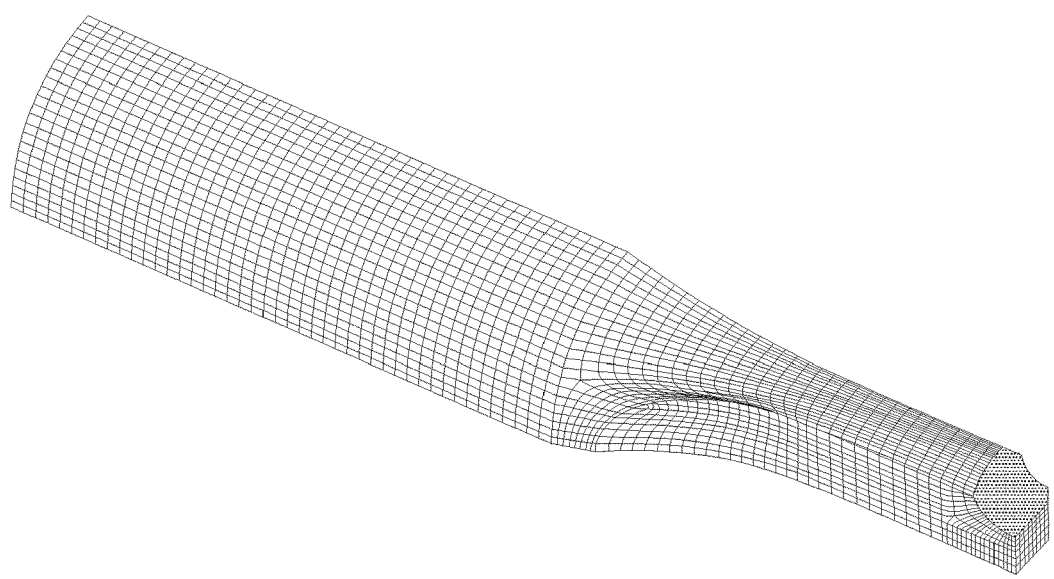
Figure 13:
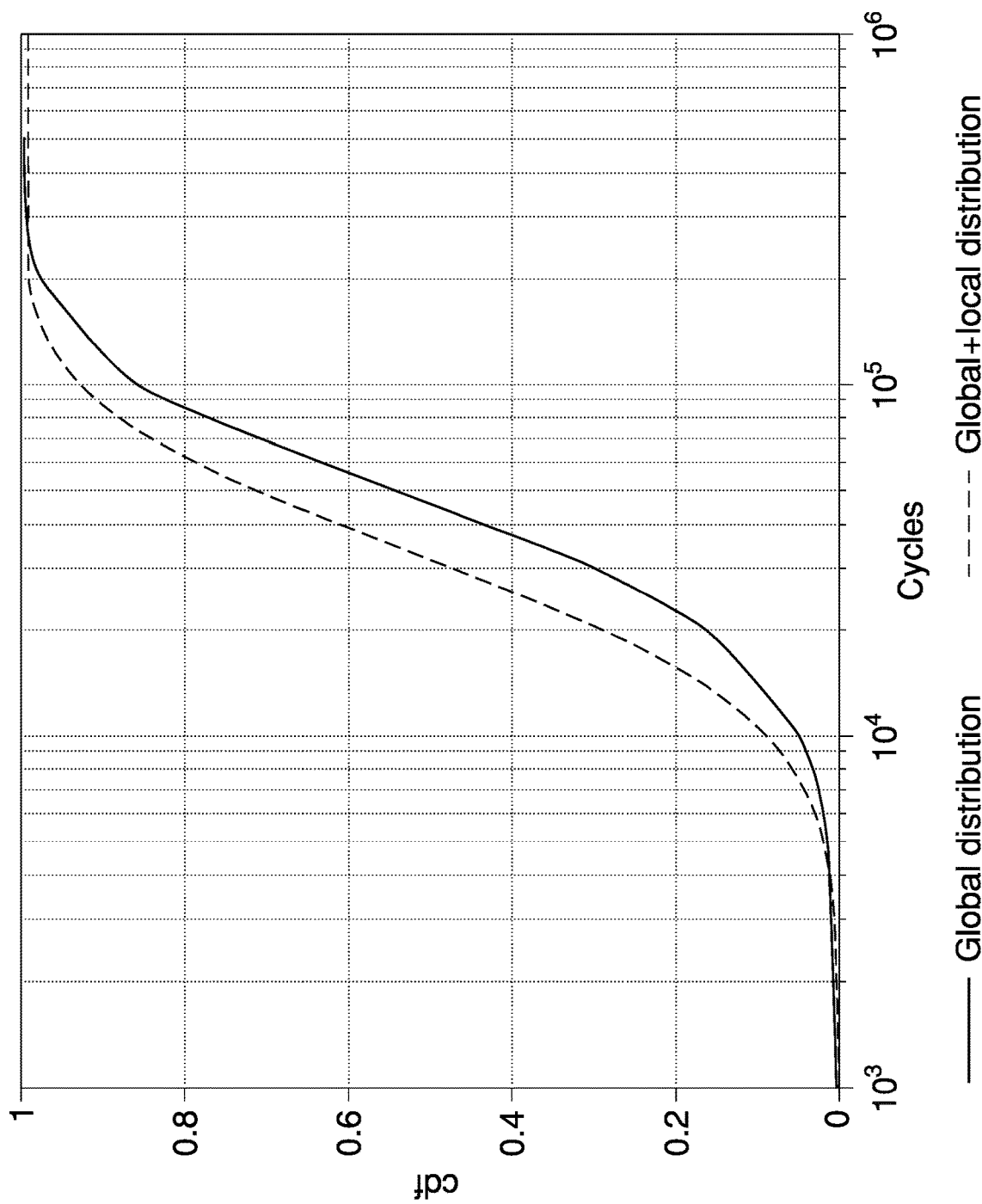

In this regard, FIGS. 12 and 13 show examples of use of several distributions of defects.

Furthermore, the use of the system according to the invention makes it possible to considerably relax the assumptions related to the distribution of the defects, description of the fatigue life, of the distribution of the sources of dispersion or of the diagram of Kitagawa (Formulation of El-Haddad or other), the relaxation of the previous hp provides more flexibility to the model to obtain a better description of the phenomenon, but does not affect the calculation time.

The invention claimed is:

1. A computer-implemented method for probabilistic assessment of fatigue of component parts in a presence of manufacturing defects, comprising:
   a) importing predefined input data concerning at least one part of a component to be assessed;
   b) distinguishing at least one surface region of said at least one part from at least one internal region of said at least one part;
   c) determining a calculated volume and stress/deformation applied to said at least one surface region and to said at least one internal region;
   d) determining a distribution of defects and assigning the distribution of defects to at least one group of elements;
   e) assessing or calculating a maximum dimension of a defect and determining the maximum dimension of the defect in each surface or internal region considered;
   f) assessing or calculating a critical dimension of the defect and determining the critical dimension of the defect in each surface region or internal region by considering a fatigue strength of a material at a number of cycles under consideration, a stress/deformation applied and a position of each surface or internal region;
   g) calculating reliability of at least one of the surface or internal regions considered; and
   h) generating output data comprising the overall probability of damage to the part for the duration and the loads examined,
   wherein said output data comprise:
      a map of the normalized failure probability, for a qualitative and visual assessment of the more critical regions of said part;
      a quantitative map of the defect critical dimension;
      a quantitative map of the failure probability relating to any mesh intergration point; and
      a quantitative map of the anomalous defect critical dimensions.

2. The computer-implemented method according to claim 1, further comprising:
   (h) determining the reliability of an entire component.

3. The computer-implemented method according to claim 1, wherein said step (b) of distinguishing at least one surface region of said part from at least one internal region of said part comprises determining said surface region on the basis of a grid of finite elements and on the basis of said distribution of defects.

4. The computer-implemented method according to claim 1, wherein said step (b) of distinguishing said at least one surface region from said at least one internal region comprises assessing said at least one surface region as a volume or wall thickness comprised in a predefined distance from an external surface of said part.

5. The computer-implemented method according to claim 2, further comprising:
   assessing presence of symmetries and removing nodes on planes of symmetry from a list of surface nodes.

6. The computer-implemented method according to claim 1, wherein said step (e) of determining the maximum dimension of the defect in each surface region and/or internal region considered comprises an application of statistics of extreme events.

7. The computer-implemented method according to claim 1, wherein performing said steps from c) to f) for all fatigue lives and for all loads applied under consideration.

8. The computer-implemented method according to claim 5, wherein said step (h) of determining the reliability of the entire component is carried out by applying the Weakest-Link model, and considering the symmetries where applicable.

9. The computer-implemented method according to claim 8, further comprising:
   (i) determining a final reliability of the component, starting from said determined reliability of the component and assessing an effect of a variability of the stress applied and of the fatigue strength of the material.

10. The computer-implemented method according to claim 1, wherein said predefined input data comprise:
    load case;
    finite-element static analysis data of said part;
    input parameters for analysis;
    parameters relating to the distribution of the defect; and
    parameters relating to the strength of the material.

11. The computer-implemented method according to claim 1, wherein said input data are at least partly stored within at least one input file.

12. A system for the probabilistic assessment of fatigue of component parts in the presence of manufacturing defects, wherein the system comprises at least one processing unit configured to carry out the steps of the computer-implemented method according to claim 1.

13. The computer-implemented method according to claim 1, wherein
    said assigning the distribution of defects to said at least one group of elements is defined by a user.

* * * * *